United States Patent
Lee

(10) Patent No.: US 7,674,006 B2
(45) Date of Patent: Mar. 9, 2010

(54) BACKLIGHT UNIT AND LIQUID CRYSTAL DISPLAY DEVICE HAVING SAME

(75) Inventor: Sang Chul Lee, Yongin-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 249 days.

(21) Appl. No.: 11/780,081

(22) Filed: Jul. 19, 2007

(65) Prior Publication Data

US 2008/0079862 A1   Apr. 3, 2008

(30) Foreign Application Priority Data

Jul. 20, 2006   (KR) ...................... 10-2006-0067992

(51) Int. Cl.
*F21V 29/00* (2006.01)
*F21S 4/00* (2006.01)

(52) U.S. Cl. ........................ 362/225; 362/97.1; 362/631

(58) Field of Classification Search ......... 362/219–225, 362/614, 613, 630–634, 559–561, 97.1–97.4, 362/217.1–217.17; 349/70
See application file for complete search history.

(56) References Cited

U.S. PATENT DOCUMENTS

| | | | |
|---|---|---|---|
| 6,984,056 B2 * | 1/2006 | Amano et al. ................ | 362/225 |
| 7,195,367 B2 * | 3/2007 | Hong et al. ................. | 362/97.3 |
| 7,196,750 B2 | 3/2007 | Koo et al. | |
| 7,325,941 B2 * | 2/2008 | Kim et al. ..................... | 362/225 |
| 7,503,682 B2 * | 3/2009 | Kim ............................ | 362/614 |
| 7,530,703 B2 * | 5/2009 | Ryu ............................ | 362/29 |
| 2005/0243548 A1 * | 11/2005 | Yamashita et al. ........... | 362/225 |
| 2006/0104094 A1 * | 5/2006 | Kang et al. ................. | 362/630 |

FOREIGN PATENT DOCUMENTS

| | | |
|---|---|---|
| JP | 2004354911 | 12/2004 |
| JP | 2006146119 | 6/2006 |
| JP | 2007058180 | 3/2007 |
| KR | 1020050064918 | 6/2005 |
| KR | 1020060017105 | 2/2006 |
| KR | 1020060022468 | 3/2006 |
| KR | 1020060073867 | 6/2006 |
| KR | 1020060106326 | 10/2006 |
| KR | 1020060119531 | 11/2006 |
| KR | 10-2007-0053056 | 5/2007 |
| KR | 10-2007-00666653 | 6/2007 |

* cited by examiner

*Primary Examiner*—Bao Q Truong
(74) *Attorney, Agent, or Firm*—F. Chau & Associates, LLC

(57) ABSTRACT

A backlight unit includes a receiving member, a lamp socket disposed in the receiving, member, a lamp coupled to the lamp socket and an inverter unit coupled to the lamp socket to supply electric power to the lamp. The receiving member further includes a guide portion for guiding the inverter unit The lamp socket includes a body, a first connector formed in a first end of the body, and a second connector formed in a second end of the body, wherein the first connector connects to the lamp and the second connector connects to the inverter unit.

17 Claims, 13 Drawing Sheets

BACKLIGHT UNIT AND LIQUID CRYSTAL DISPLAY DEVICE HAVING SAME

CROSS-REFERENCE TO RELATED APPLICATION

This application claims priority to Korean Patent Application No. 10-2006-67992 filed on Jul. 20, 2006, the contents of which are herein incorporated by reference in their entirely.

BACKGROUND OF THE INVENTION

1. Technical Field

The present disclosure relates to a backlight unit and a liquid crystal display device having the same, and more particularly, to a backlight unit having a crack prevention structure and a liquid crystal display device having the same.

2. Discussion of Related Art

In a liquid crystal display (LCD) device, an inverter is used to drive a backlight: unit. The inverter is connected to a lamp by a variety of methods. The lamp and the inverter can be connected to each other using a wire and a connector. However, when the inverter is coupled to or detached from the lamp, the lamp must be disassembled to rework the inverter.

Instead of using the wire and connector, an inverter electrode portion can be inserted in a connector using a sliding method. In the sliding method, assembly and disassembly efficiency can be enhanced. However, a crack can be generated on the inverter electrode portion or the connector in which the inverter electrode portion is inserted. Since the inverter uses electric power of high voltage, if a crack is generated in a component of the inverter, a lamp may operate abnormally and the inverter can be burned.

SUMMARY OF THE INVENTION

According to an embodiment of the present invention, a backlight unit has a crack prevention structure for preventing a crack from being generated in an inverter unit coupled to a lamp socket.

According to an embodiment of the present invention, a backlight unit comprises a receiving member, a lamp socket disposed in the receiving member, a lamp coupled to the lamp socket and an inverter unit coupled to the lamp socket to supply electric power to the lamp.

The receiving member may further comprise a guide portion for guiding the inverter unit.

The lamp socket may comprise a body, a first connector formed in a first end of the body, and a second connector formed in a second end of the body.

The first connector of the lamp socket may be disposed on a first surface of the receiving member and the second connector is disposed on a second surface of the receiving member.

A first portion of the lamp socket may be disposed on a first side of the receiving member and a second portion of the lamp socket may be disposed on a second side of the receiving member.

The lamp may comprise a lamp tube having a discharge gas and a phosphor layer and electrode portions provided at both ends of the lamp tube.

The electrode portion can be coupled to the first connector of the lamp socket.

The inverter unit may comprise an inverter, an inverter printed circuit board having the inverter mounted thereon, and an inverter electrode portion formed in an end of the inverter printed circuit board.

The inverter electrode portion is connected to the second connector of the lamp socket.

The inverter electrode portion is formed at the end of the inverter printed circuit board to protrude the second connector of the receiving member.

The inverter printed circuit board has protrusions formed at both top and bottom ends of the inverter printed circuit board to be received by a corresponding guide portion of the receiving member.

The guide portion may comprise a first guide formed at a first side of the receiving member, and a second guide formed at a second side of the receiving member, the second guide being opposite to the first guide.

Each of the first and second guides may be bent into a predetermined shape.

The predetermined shape has an L-shaped cross section.

The guide portion and me receiving member may be integrally formed.

The guide portion may comprise a plurality of first guides and a plurality of second guides, the plurality of first guides are spaced apart from each other by an interval and the plurality of second guides are spaced apart from each other by an interval.

According to an embodiment of the present invention, a liquid crystal display device comprises a liquid crystal display panel for displaying an image, and a backlight unit including a receiving member, a lamp socket disposed in the receiving member, a lamp coupled to a first portion of the lamp socket, and an inverter unit coupled to a second portion of the lamp socket to supply electric power to the lamp, wherein the first portion is positioned opposite the second portion.

The receiving member may further comprise a guide portion for guiding the inverter unit.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF EXEMPLARY EMBODIMENTS

Exemplary embodiments of the present invention will be described in more detail with references to the accompanying drawings. The present invention may be embodied in many different forms and should not be construed as limited to the embodiments set forth herein.

Figure 1A:
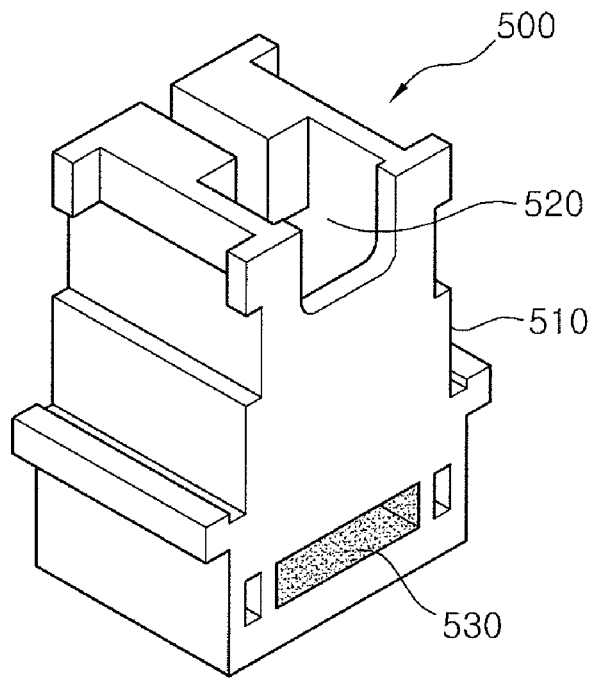
FIGS. 1A and 1B are schematic perspective and side views of a lamp socket, respectively, according to an embodiment of the present invention.
Figure 1B:
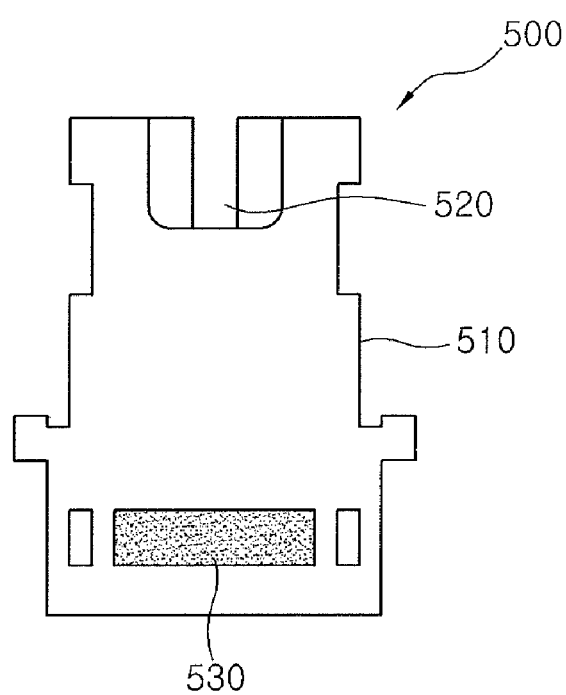
Figure 1C:
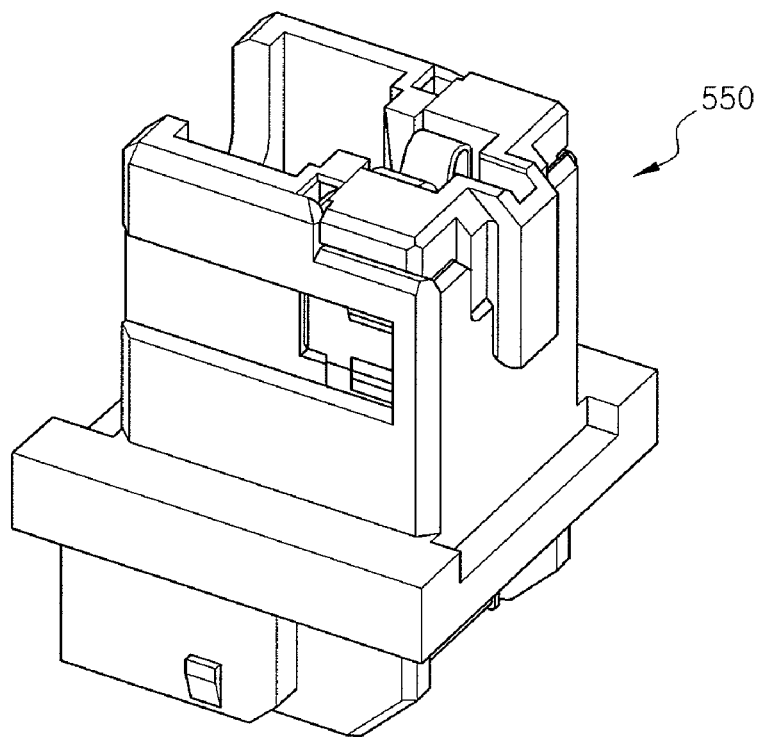
FIGS. 1C, 1D, 1E and 1F are schematic views of a lamp socket element, respectively, according to an other embodiment of the present invention.
Figure 1D:
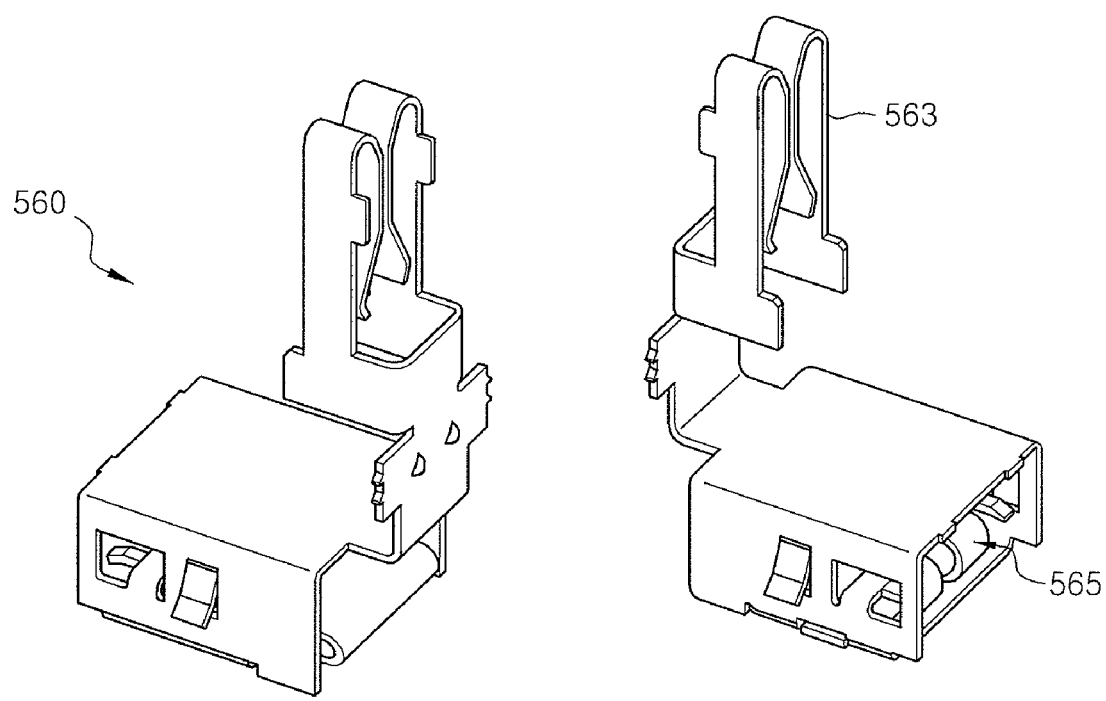
Figure 1E:
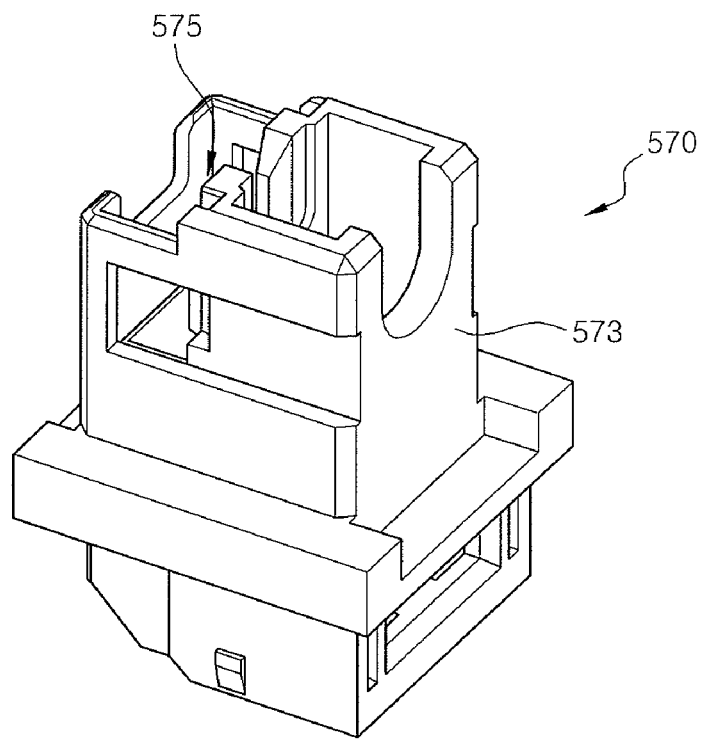
Figure 1F:
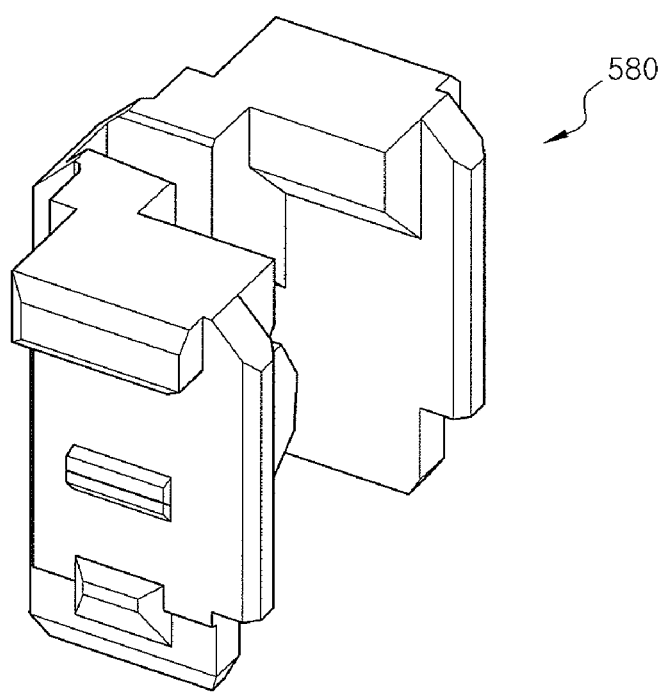

FIGS. 1A and 1B are schematic perspective and side views of a lamp socket, respectively, according to an embodiment of the present invention.

Referring to FIGS. 1A and 1B, a lamp socket 500 comprises a body 510, a first connector 520 and a second connector 530.

The first connector 520 is formed at an end of the body 510, for example, an upper end of the body. The second connector 530 is formed near the other end of the body 510, for example, a lower end of the body. The first connector 520 is provided with a space for receiving an end of a lamp. An electrode portion of the lamp is inserted into the first connector 520, thereby being electrically and mechanically coupled to the first connector 520. An electrode portion of an inverter is inserted into and connected to the second connector 530 to supply electric power to the electrode portion of the lamp connected to the first connector. The first and second connectors 520 and 530 are electrically connected to each other in the body 510. The electrode portions of the lamp and inverter are connected to each other through the first and second connectors 520 and 530 of the lamp socket 500.

FIGS. 1C, 1D, 1E and 1F are schematic views of a lamp socket element, respectively, according to an other embodiment of the present invention.

Referring to FIGS. 1A to 1F, the lamp socket 550 includes a contact terminal 560, a housing 570 aid a cover 580. The lamp socket 550 fixes a lamp (not shown) and serves as a connector for supplying power to the lamp. The contact terminal 560 includes a first contact 563 to which the electrode of the lamp is fastened and fixed, and a second contact 565 to which an inverter electrode portion of the inverter unit (not shown) is fastened and fixed. The housing 570 includes a base portion 573 having a space 575 to receive the contact terminal 560, and the contact terminal 560 is coupled to the housing 570 and the cover 580.

Figure 2A:
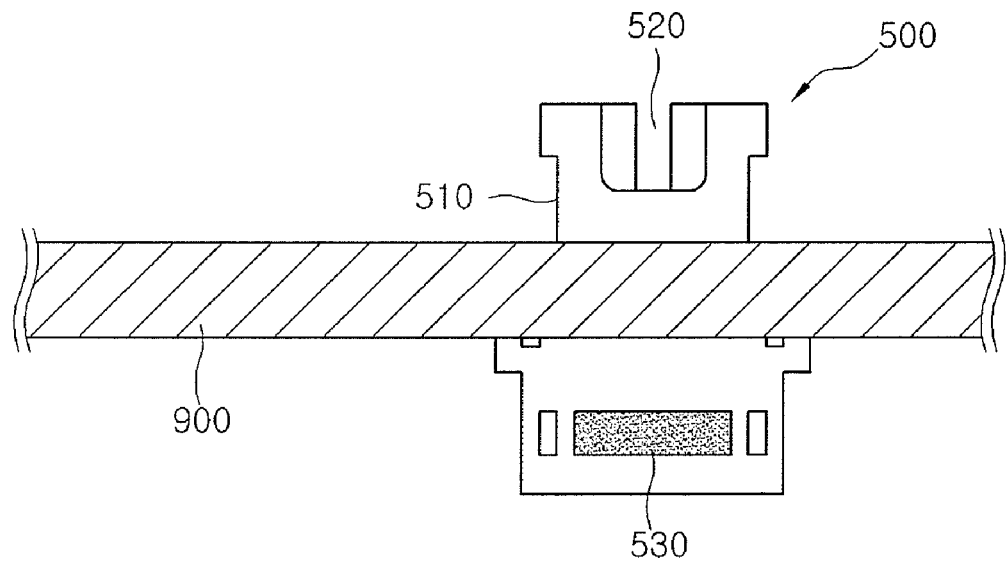
FIG. 2A is a view showing a lamp socket coupled to a lower receiving member according to an embodiment of the present invention.
Figure 2B:
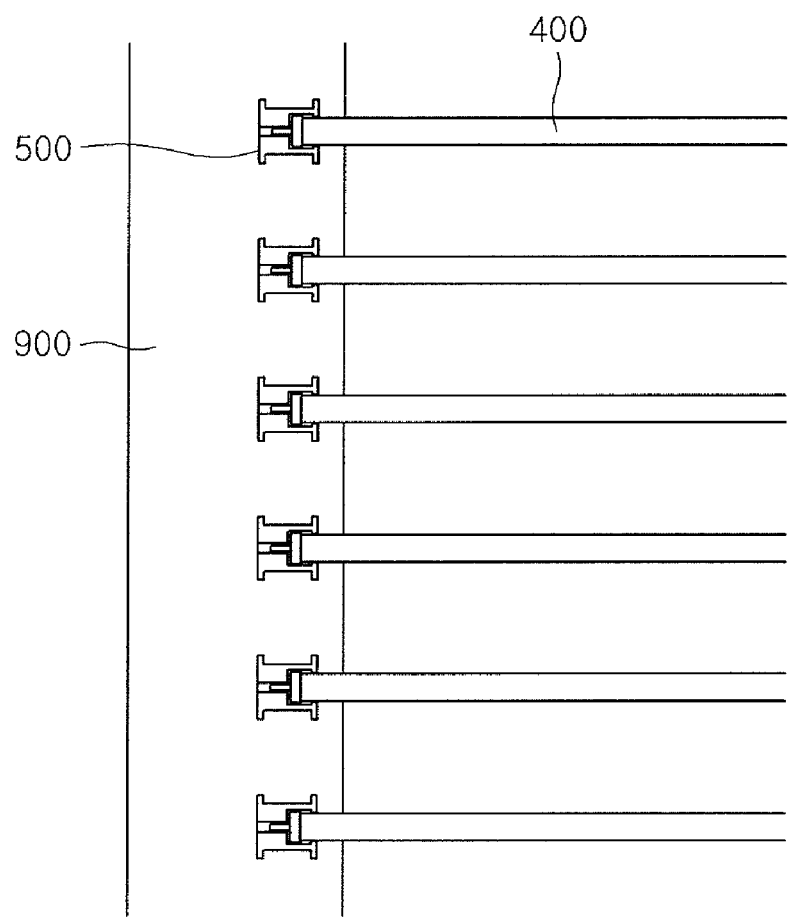
FIGS. 2B and 2C are plait and perspective views, respectively, showing a lamp coupled to a lamp socket according to an embodiment of the present invention.
Figure 2C:
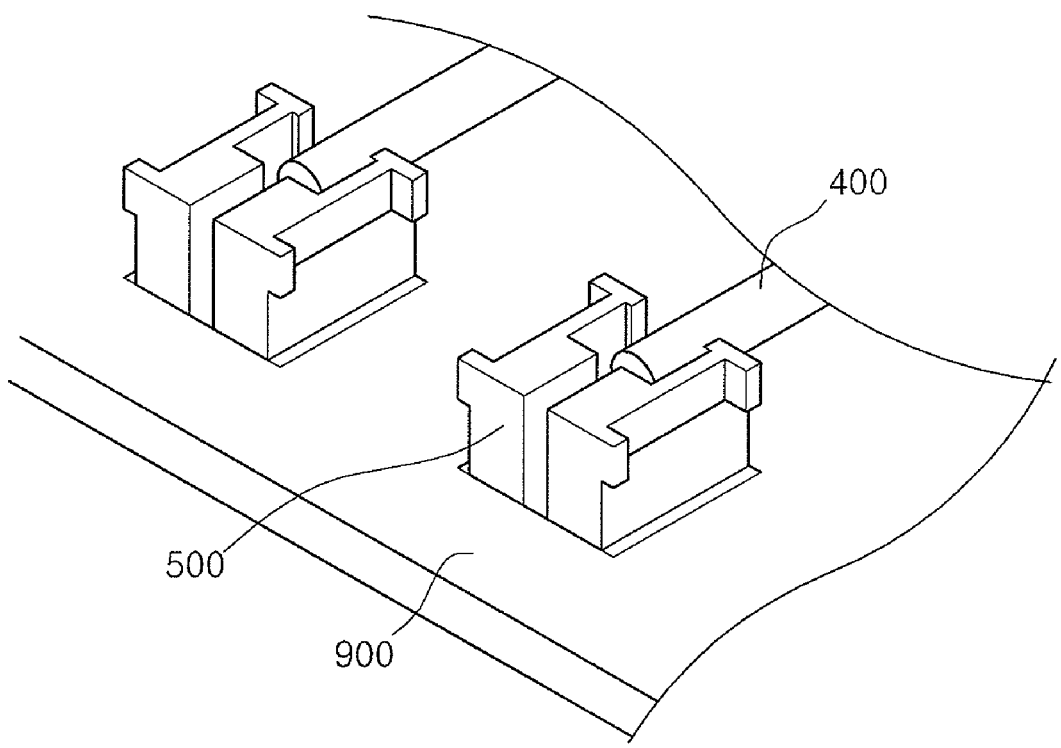
Figure 3:
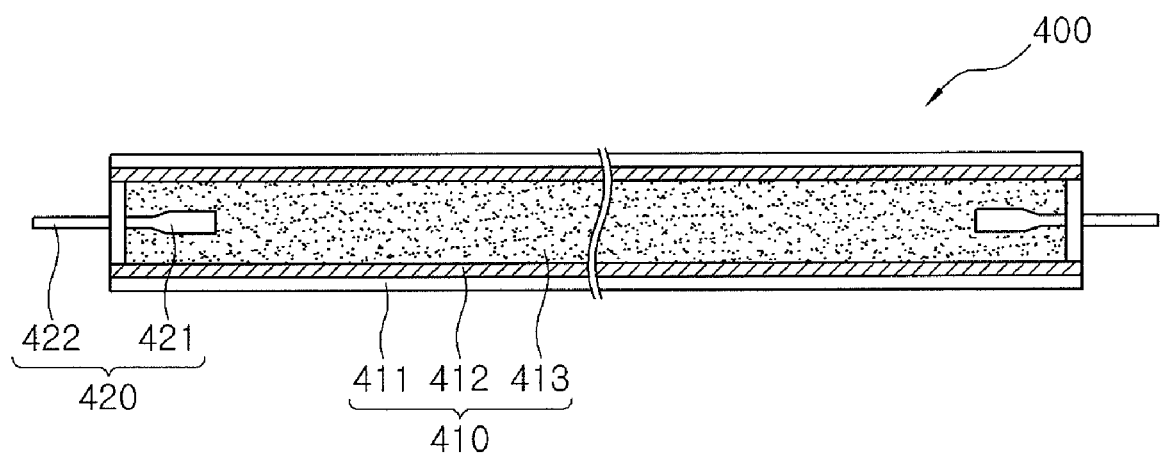
FIG. 3 is a schematic sectional view of a lamp according to an embodiment of the present invention.

FIG. 2A is a view showing the lamp socket 500 coupled to a lower receiving member according to an embodiment of the present invention. FIGS. 2B and 2C are plan and perspective views showing a lamp coupled to the lamp socket 500 according to an embodiment of the present invention. FIG. 3 is a schematic sectional view of a lamp according to an embodiment of the present invention.

FIG. 2A shows the lamp socket 500, which is coupled to a lower receiving member 900. An upper end portion of the lamp socket 500 on which the first connector 520 is formed is disposed on a top surface of the lower receiving member 900. A lower end portion, on which the second connector 530 is formed, is disposed on a bottom surface of the lower receiving member 900. The top surface of the lower receiving member 900 is the surface over which a receiving space is provided. The bottom surface is the surface positioned opposite the top surface. The lower receiving member 900 is formed with a hole (not shown) having a shape corresponding to the lamp socket 500. The lamp socket 500 can be fixedly inserted into the hole.

FIGS. 2B and 2C show that lamps 400 are coupled to the lamp sockets 500. Some of the lamp sockets 500 are disposed at a first side of the lower receiving member 900 to be spaced apart from each other by a predetermined interval. Some of the lamp sockets 500 are symmetrically disposed at a second side, which is opposite the first side of the lower receiving member 900.

Referring to FIG. 3, each lamp 400 comprises a lamp tube 410 and electrode portions 420. The lamp tube 410 comprises a tube body 411, a phosphor layer 412 and discharge gas 413. The electrode portions 420, each of which includes a lamp electrode 421 and a lead wire 422, are disposed at both ends of the lamp tube 410. When electric power is applied to the lamp 400 through the lead wires 422 from the outside, the electric power is supplied to the lamp electrodes 421. That is, the lead wire 422 is connected to the first connector 520 of the lamp socket 500, and the electric power supplied from the outside through the second connector 530 is applied to the lamp electrode 421 through the first connector 520 and the lead wire 422. When the electric power is applied to the lamp electrodes 421, the discharge gas 413 in the lamp tube 410 is changed a plasma state and emits non-visible rays. Then, the non-visible rays stimulate the phosphor layer 412 to radiate visible rays to the outside.

In an embodiment of the present invention, the cold cathode fluorescent lamp can be employed.

Figure 4A:
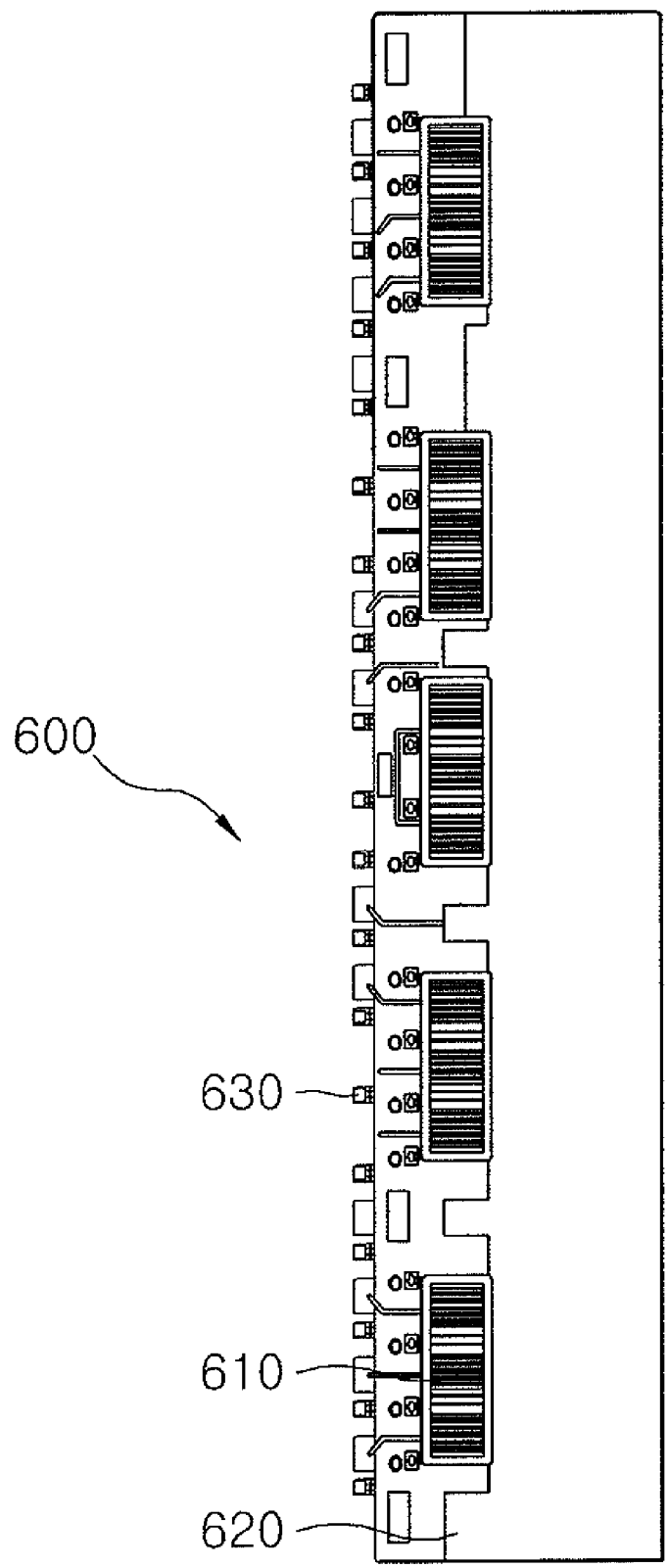
FIG. 4A is a schematic perspective view of an inverter unit according to an embodiment of the present invention.
Figure 4B:
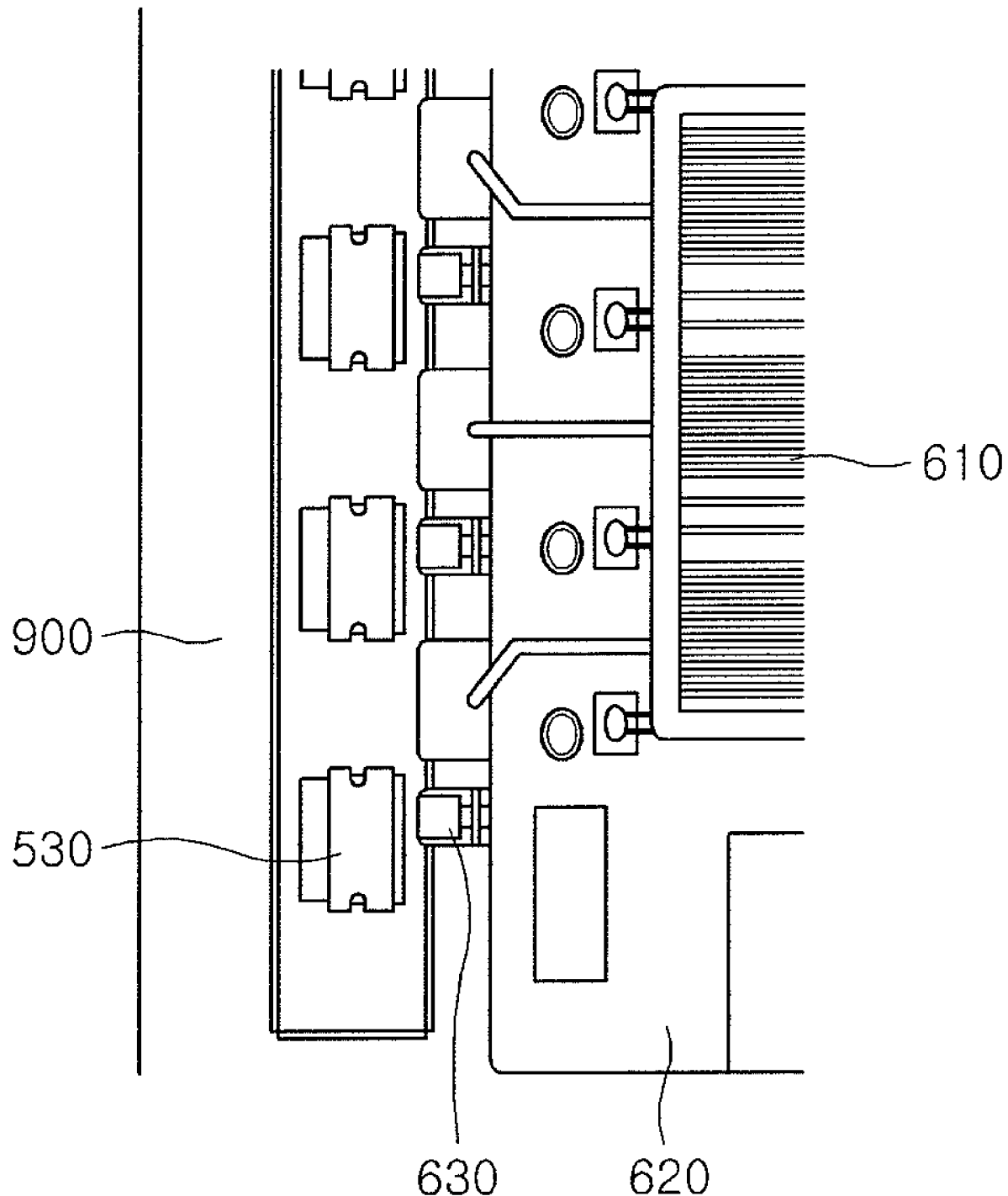
FIG. 4B is an enlarged view of a portion of FIG. 4A.

FIG. 4A is a schematic perspective view of an inverter unit according to an embodiment of the present invention. FIG. 4B is an enlarged view of a portion of FIG. 4A.

Referring to FIGS. 4A and 4B, an inverter unit 600 comprises inverters 610, an inverter printed circuit board 620 and inverter electrode portions 630.

Since the cold cathode fluorescent lamp operates using an alternating voltage, to operate the cold cathode fluorescent lamp, the inverter 610 converts a direct voltage supplied from the outside into an alternating voltage and outputs the alternating voltage.

The inverter printed circuit board 620 is formed with a circuit pattern and the inverter 610 is mounted on the inverter printed circuit board 620. The inverter printed circuit board 620 may be further mounted with a transformer (not shown) for converting a level of the output alternating voltage, a controller (not shown) for controlling an operation of the inverter 610 and other components.

The inverter electrode portion 630, which is an output terminal through which the alternating voltage converted through the inverter 610 is output, is formed in an end of the inverter printed circuit board 620. The inverter electrode portion 630 is electrically connected to the inverter 610 through the circuit patterns (not shown). The inverter electrode portion 630 is inserted into and connected to the second connectors 530 of the lamp sockets 500 disposed on the bottom surface of the lower receiving member 900.

Figure 5A:
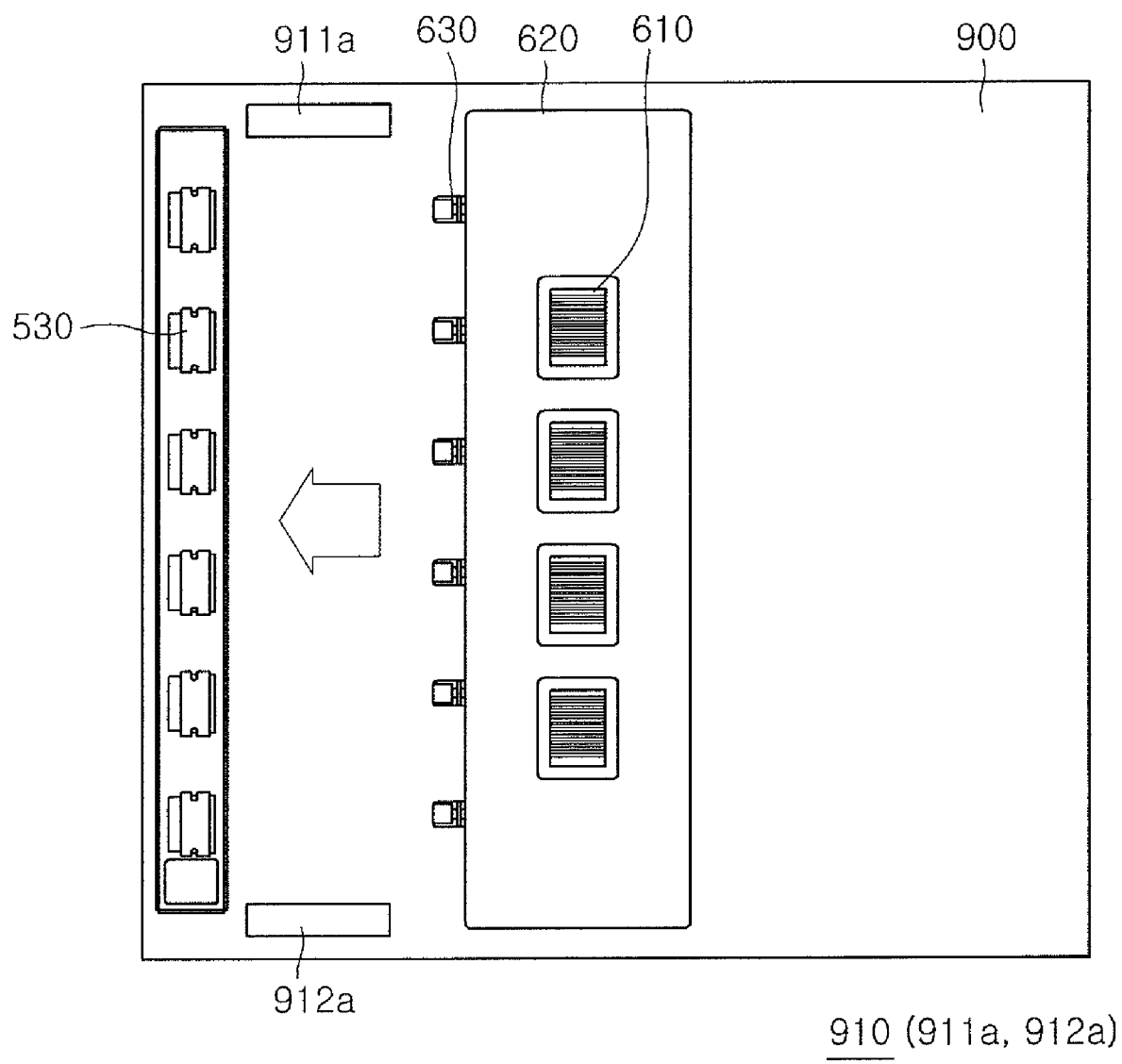
FIG. 5A is a view for illustrating a process of coupling an inverter unit in a backlight unit according to an embodiment of the present invention.
Figure 5B:
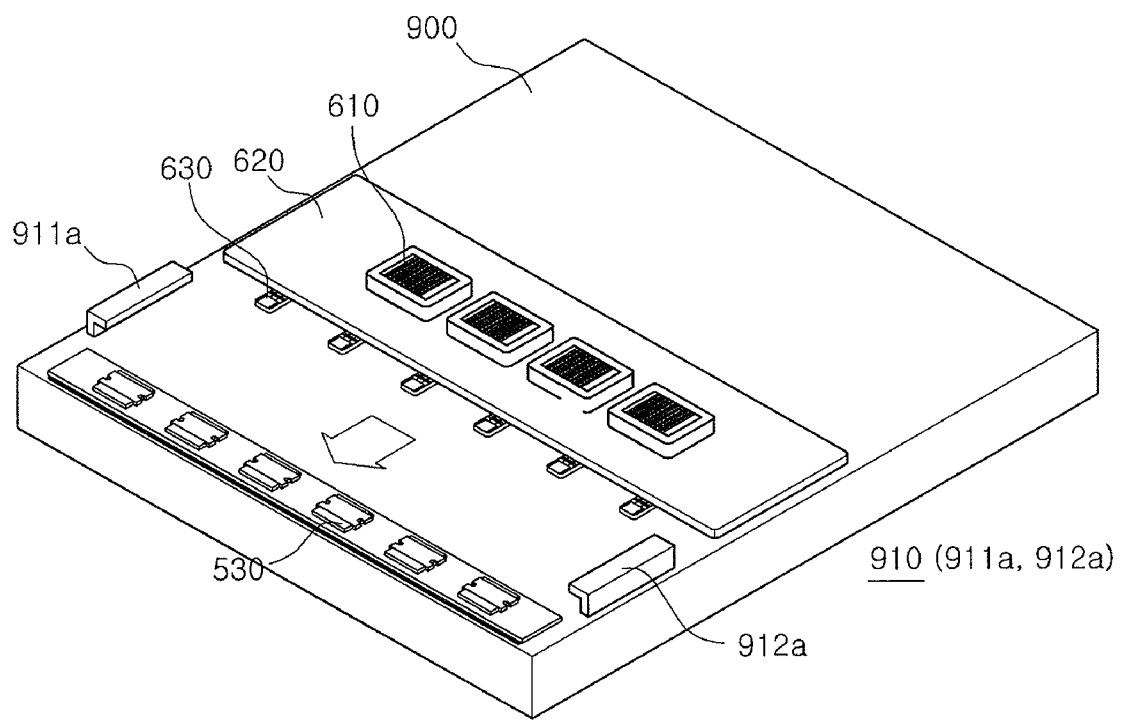
FIGS. 5B and 5C are a bottom perspective view and a side view of a backlight unit respectively, according to an embodiment of the present invention.
Figure 5C:
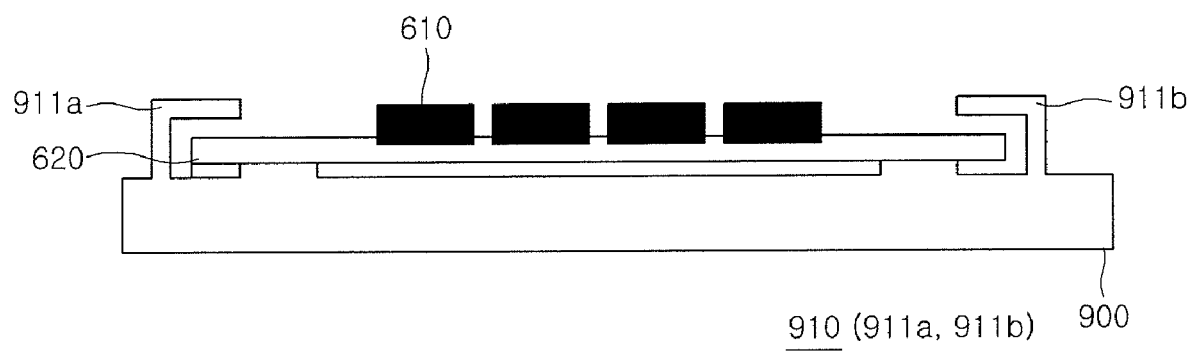

FIG. 5A is a view for illustrating a process of coupling the inverter unit 600 in a backlight unit according to an embodiment of the present invention. FIGS. 5B and 5C are a bottom perspective view and a side view of the backlight unit, respectively, according to an embodiment of the present invention.

Referring to FIGS. 5A to 5C, a guide portion 910 is formed on the bottom surface of the lower receiving member 900 to guide a route along which the inverter unit 600 is coupled to or detached from the second connectors 530 of the lamp sockets 500.

In an embodiment, the guide portion 910 comprises first and second guides 911*a* 912*a* respectively formed on upper and lower end portions of the bottom surface of the lower receiving member 900. In an embodiment, the first and second guides 911*a* and 912*a* can be respectively formed on an upper left end portion and a lower left end portion of the bottom surface of the lower receiving member 900. The second connectors 530 of the lamp sockets 500 can be disposed in the left and right sides of the lower receiving member 900, respectively. The second connectors 530 disposed in the right side are omitted in these figures.

Each of the first and second guides 911*a* and 912*a* is formed to have, for example, art L-shaped cross section. That is, the first and second guides 911*a* and 912*a* are formed to have vertical sections and horizontal sections. The vertical sections are vertically extended from the bottom surface of the lower receiving member 900. The horizontal sections are horizontally extended from the distal ends of the first sections toward each other to be parallel with the bottom surface of the lower receiving member 900.

In an embodiment of the present invention, the guide portion 910 and the lower receiving member 900 can be integrally formed. In an embodiment of the present invention, a length of each vertical section of the first and second guides 911*a* and 912*a* (that is, a height of the first and second guides 911*a* and 912*a*) can be slightly larger than a thickness of the inverter printed circuit board 620, and each horizontal section of the first and second guides 911*a* and 912*a* extends to partially cover each upper and lower end of the inverter printed circuit board 620. In an embodiment of the present invention, a distance between the vertical sections of the first and second guides 911*a* and 912*a* may correspond to a width of the inverter printed circuit board 620.

The inverter unit 600 moves in a sliding manner in the left direction along the guide portion 910 toward the second connectors 530 disposed in the left side of the lower receiving member 900, so that the inverter electrode portion 630 is inserted into the second connectors 530 and electrically and mechanically connected to the second connectors 530.

If the inverter unit 600 moves along the guide portion 910 and the inverter electrode portions 630 are inserted into the second connectors 530 of the lamp sockets 500, the inverter printed circuit board 620 of the inverter unit 600 is prevented from floating by the guide portion 910. Thus, a crack can be prevented from being generated on the inverter electrode portion 630 or the second connector 530.

In an embodiment of the present invention, the guide portion 910 can be formed near the second connectors 530 disposed in the left or left end side of the lower receiving member 900. In an embodiment of the present invention, the guide portion 910 may be formed near the second connectors 530 disposed on the right side of the lower receiving member 900. In an embodiment, the guide portion 910 can be formed in both the right and left sides of the lower receiving member 900. The inverter unit 600 may be inserted into the second connectors 530 disposed on the left end side, on the right end side or on the left and right end sides of the lower receiving member 900.

Figure 6:
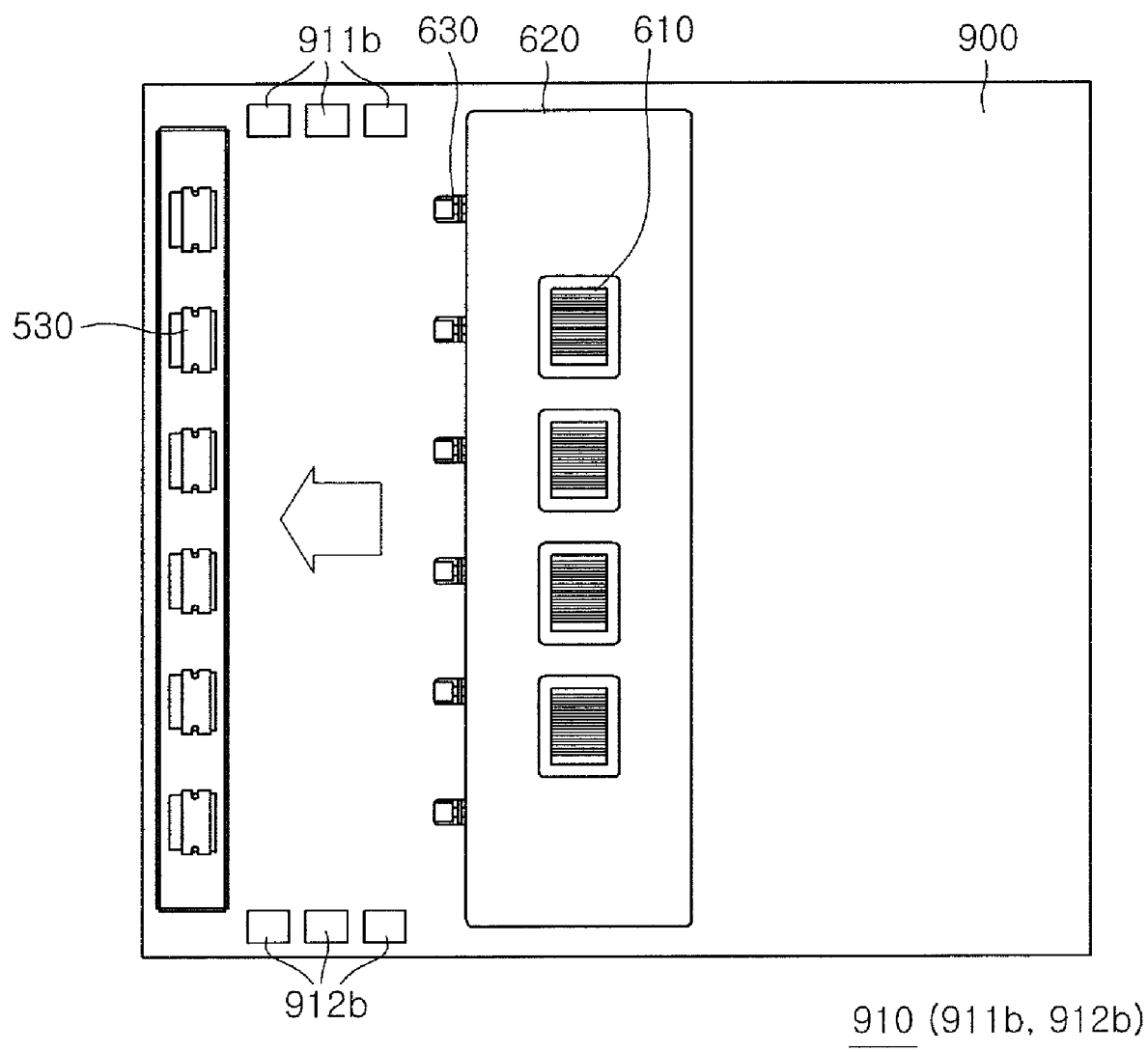
FIG. 6 illustrates a method of coupling an inverter unit to a backlight unit according to an embodiment of the present invention.
Figure 7:
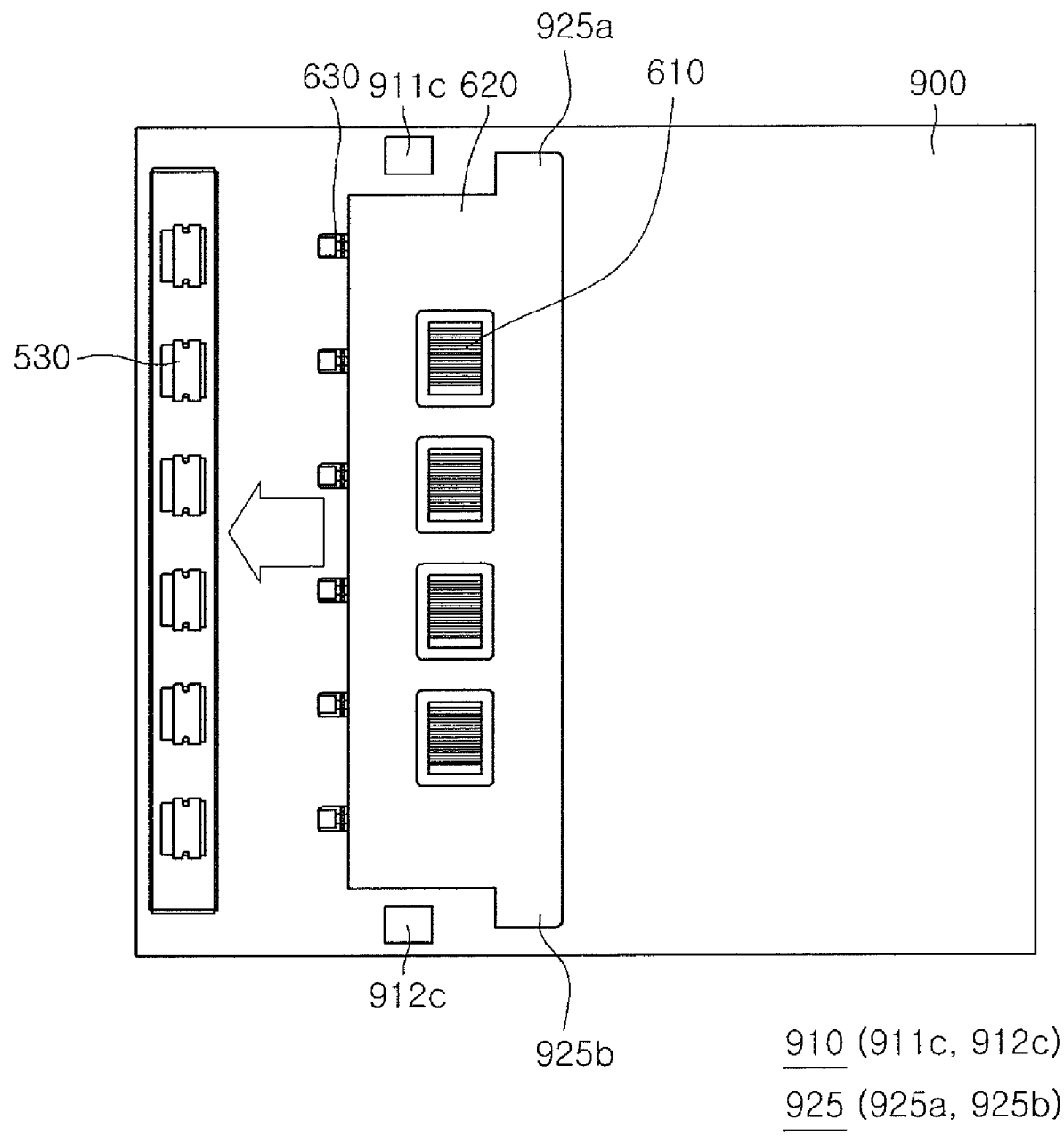
FIG. 7 illustrates a method of coupling an inverter unit to a backlight unit according to an embodiment of the present invention.

FIGS. 6 and 7 are views illustrating a method of coupling the inverter unit 600 to a backlight unit according to embodiments of the present invention. The configurations of the embodiments shown in FIGS. 6 and 7 are similar to those of the embodiment illustrated in connection with FIGS. 5A-5C, except for the guide portion 910. Referring to FIG. 6, the guide portion 910 is formed on the bottom surface of the lower receiving member 900 to guide the inverter unit 600 so that the inverter unit 600 can be coupled to or detached from the second connectors 530 of the lamp sockets 500. The guide portion 910 may include three first guides 911*b* formed on an upper left side of the bottom surface of the lower receiving member 900 and three second guides 912*b* formed on a lower left side of the bottom surface of the lower receiving member 900 according to an embodiment of the present invention. In an embodiment of the present invention, the first guides 911*b* and the second guides 912*b* can be formed on an upper right side and a lower right side of the bottom surface of the lower receiving member 900. The first guides 911*b* are spaced apart from each other by an interval, and the second guides 912*b* are also spaced apart from each other by an interval. Each of the first and second guides 911*b* and 912*b* is formed to have, for example, an L-shaped cross section. In an embodiment of the present invention, the number of the first or second guides 911*b* and 912*b* can vary.

Referring to FIG. 7, the guide portion 910 is formed on the bottom surface of the lower receiving member 900 to guide the inverter unit 600 so that the inverter unit 600 can be coupled to or detached from the second connectors 530 of the lamp sockets 500. Tire guide portion 910 includes a first guide 911*c* formed on an upper end side, for example, an upper left end side of the bottom surface of the lower receiving member 900 and a second guide 912*c* formed on a lower end side, for example, a lower left end side of the bottom surface of the lower receiving member 900 according to an embodiment of the present invention. Each of the first and second guides 911*c* and 912*c* is formed to have, for example, an L-shaped cross section.

Protrusions 925*a* and 925*b* are respectively formed on both top and bottom ends of the inverter printed circuit board 620. The first and second guides 911*c* and 912*c* are configured such that the first and second guides 911*c* and 912*c* can receive the protrusions 925*a* and 925*b* when the inverter unit 600 is inserted into the second connectors 530.

If the inverter unit 600 moves along the first and second guides 911*c* and 911*c* and then the inverter unit 600 is inserted into the second connectors 530 of the lamp sockets 500, the protrusions 925*a* and 925*b* formed on both the top and bottom ends of the inverter printed circuit board 620 of the inverter unit 600 are prevented from floating by the guide portion 910, whereby the entire inverter printed circuit board 620 is also prevented from floating. As a result, a crack can be prevented from being generated on the inverter electrode portion 630 or the second connector 530.

Figure 8A:
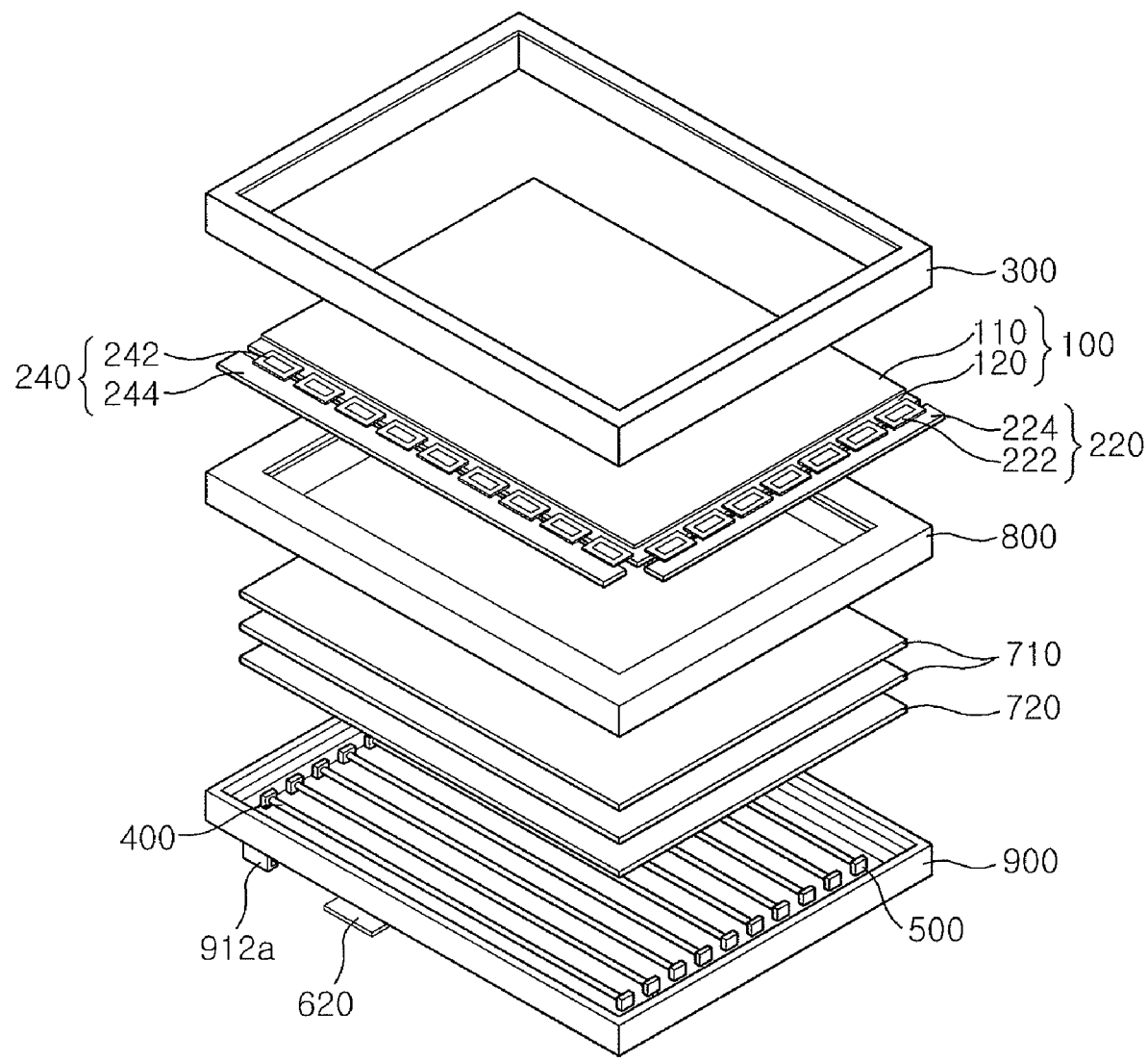
FIG. 8A is an exploded perspective view of a liquid crystal display device having a backlight unit according to an embodiment of the present invention.
Figure 8B:
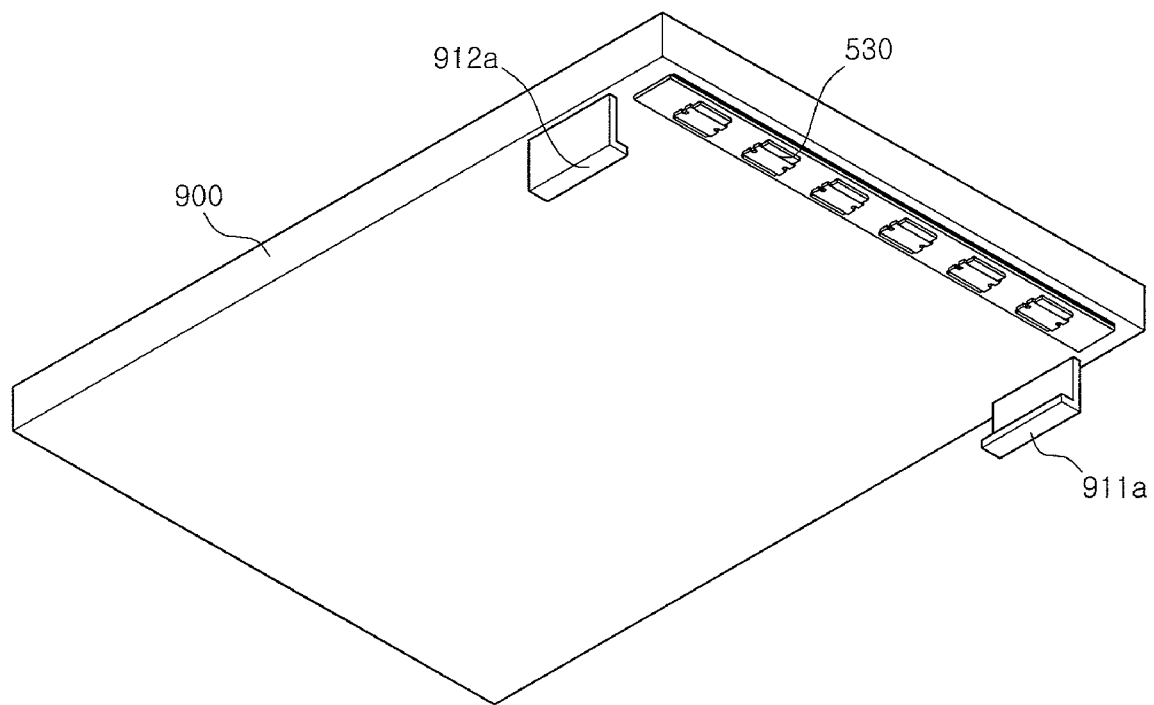
FIG. 8B is a bottom perspective view of a lower receiving member shown in FIG. 8A according to an embodiment of the present invention.

FIG. 8A is an exploded perspective view of a liquid crystal display device having a backlight unit according to an embodiment of the present invention. FIG. 8B is a bottom perspective view of a lower receiving member shown in FIG. 8A.

Referring to FIGS. 8A and 8B, the liquid crystal display device comprises an upper receiving member 300, a liquid crystal display (LCD) panel 100, driving circuit units 220 and 240, a mold frame 800, a plurality of optical sheets 710, a diffusion plate 720, lamps 400 and a lower receiving member 900.

A first driving circuit unit 220 comprises a gate side printed circuit board 224 connected to the LCD panel 100 and having a control integrated circuit (IC) mounted on the gate side printed circuit board 224 to apply a gate signal to a gate line of a thin film transistor (TFT) substrate 120. A second driving circuit, unit 240 includes a data side printed circuit board 244 connected to the LCD panel 100 and having a control IC mounted on the data side printed circuit board 244 to apply a data signal to a data line of the TFT substrate 120. The second driving circuit unit 220 includes a gate side flexible printed circuit board 222 for connecting the TFT substrate 120 and the gate side printed circuit board 224. The first driving circuit unit 240 includes a data side flexible printed circuit board 242 for connecting the TFT substrate 120 and the data side printed circuit board 244.

The gate and data side printed circuit boards 224 and 244 are connected to the gate and data side flexible printed circuit boards 222 and 242, respectively, to apply gate driving signals and external image signals. According to an embodiment of the present invention, the gate and data side printed circuit boards 224 and 244 may be integrated to form a single printed circuit board. Driving ICs (not shown) can be mounted to the flexible printed circuit boards 222 and 242 to transmit, for example, red, green and blue (R, G, B) signals or power generated in the printed circuit boards 224 and 244 to the liquid crystal panel 100.

The upper receiving member 300 can be formed, for example, in a rectangular frame shape having flat and side wall sections, which have a perpendicularly-bent shape, to prevent the liquid crystal display panel 100 and the driving, circuit units 220 and 240 from being deviated. The upper receiving member 300 protects the liquid crystal panel 100 and the driving circuit units 220 and 240 against a shock applied from the outside.

The plurality of optical sheets 710, the diffusion plate 720, one or more lamps 400 and the reflection plate 600 are stacked sequentially to be received by the mold frame 800. The lower receiving member 900 is provided to be coupled to the mold frame 800 and support other components.

The lamp sockets 500 can be fixedly coupled to both opposite sides of the lower receiving member 900. The lamps 400 are connected to the first connectors 520 formed in the upper end portions of the lamp sockets 500 and the inverter unit 600 is connected to the second connectors 530 formed in the lower end portions. The guide portion 910 (911*a* and 912*a,* 911*b* and 912*b,* or 911*c* and 912*c*) is formed on the bottom surface of the lower receiving member 900 to guide the inverter unit 600 so that the inverter unit 600 can be coupled to or detached from the second connectors 530 of the lamp sockets 500.

According to an embodiment of the present invention, the guide portion is formed on the lower receiving member of the backlight unit to guide the inverter unit so that the inverter unit can be coupled to or detached from the lower receiving member. As a result, the inverter unit is prevented from floating when the inverter unit is coupled to or detached from the connector of the lamp socket in a sliding manner. Thus, a crack or damage can be prevented from being generated on the inverter.

Although exemplary embodiments have been described herein with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A backlight unit, comprising:
   a receiving member;
   a lamp socket disposed in the receiving member;
   a lamp coupled to the lamp socket; and
   an inverter unit coupled to the lamp socket to supply electric power to the lamp, wherein the receiving member further comprises a guide portion for guiding the inverter unit, and wherein the lamp socket comprises a body, a first connector formed in a first end of the body, and a second connector formed in a second end of the body, wherein the first connector connects to the lamp and the second connector connects to the inverter unit,
   wherein the inverter unit comprises an inverter, an inverter printed circuit board including the inverter mounted thereon, and an inverter electrode portion formed in an end of the inverter printed circuit board,
   wherein the end of the inverter printed circuit board is inserted in the second connector.

2. The backlight unit of claim 1, wherein the first connector of the lamp socket is disposed on a first surface of the receiving member and the second connector is disposed on a second surface of the receiving member.

3. The backlight unit of claim 1, wherein a first portion of the lamp socket is disposed on a first side of the receiving member and a second portion of the lamp socket is disposed on a second side of the receiving member.

4. The backlight unit of claim 1, wherein the lamp comprises a lamp tube having a discharge gas and a phosphor layer, and electrode portions provided at both ends of the lamp tube.

5. The backlight unit of claim 1, wherein the electrode portion is coupled to the first connector of the lamp socket.

6. The backlight unit of claim 1, wherein the inverter electrode portion is connected to the second connector of the lamp socket.

7. The backlight unit of claim 1, wherein the inverter electrode portion protrudes from the end of the inverter printed circuit board to the second connector of the lamp socket.

8. The backlight unit of claim 1, wherein the inverter printed circuit board has protrusions formed at both top and bottom ends of the inverter printed circuit board to be received by a corresponding guide portion of the receiving member.

9. The backlight unit of claim 1, wherein the guide portion comprises a first guide formed at a first side of the receiving member, and a second guide formed at a second side of the receiving member, wherein the second guide is formed opposite the first guide.

10. The backlight unit of claim 1, wherein each of the first and second guides is bent into a predetermined shape.

11. The backlight unit of claim 1, wherein the predetermined shape has an L-shaped cross section.

12. The backlight unit of claim 1, wherein the guide portion and the receiving member are integrally formed.

13. The backlight unit of claim 1, wherein the guide portion comprises a plurality of first guides and a plurality of second guides, the plurality of first guides are spaced apart from each other by an interval and the plurality of second guides are spaced apart from each other by an interval.

14. The backlight unit of claim 1, wherein the inverter unit is moved in a sliding manner, and is inserted into the second connectors.

15. The backlight unit of claim 1, wherein the lamp socket comprises a contact terminal, a housing and a cover, and
   wherein tire contact terminal includes a first contact and a second contact, and the housing includes a base portion having a space to receive the contact terminal, and
   wherein the lamp is fastened and fixed to the first contact, an inverter electrode portion of the inverter unit is fastened and fixed to the second contact and the contact terminal is coupled to the housing and the cover.

16. A liquid crystal display device, comprising:
   a liquid crystal display panel for displaying an image; and
   a backlight unit including a receiving member, a lamp socket disposed in the receiving member, a lamp coupled to the lamp socket, and an inverter unit coupled to the lamp socket to supply electric power to the lamp, wherein the receiving member further comprises a guide portion for guiding the inverter unit, and wherein the lamp socket comprises a body, a first connector formed in a first end of the body, and a second connector formed in a second end of the body, wherein the first connector connects to the lamp and the second connector connects to the inverter unit, wherein the inverter unit is moved in a sliding manner, and is inserted into the second connectors.

17. The liquid crystal display device of claim 16, wherein the lamp socket comprises a contact terminal, a housing and a cover, and wherein the contact terminal includes a first contact and a second contact, and the housing includes a base portion having a space to receive the contact terminal, and wherein the lamp is fastened and fixed to the first contact, an inserter electrode portion of the inverter unit is fastened and fixed to the second contact and the contact terminal is coupled to the housing and the cover.

* * * * *